United States Patent
Gill

(12) 
(10) Patent No.: US 6,271,997 B1
(45) Date of Patent: Aug. 7, 2001

(54) READ HEAD SPIN VALVE SENSOR WITH TRIPLE ANTIPARALLEL COUPLED FREE LAYER STRUCTURE

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,199

(22) Filed: Nov. 22, 1999

(51) Int. Cl.$^7$ ........................................................ G11B 5/39
(52) U.S. Cl. ........................................ 360/314; 360/324.12
(58) Field of Search ............................ 360/324.2, 324.1, 360/324.11, 327.3, 324, 324.12, 314

(56) References Cited

U.S. PATENT DOCUMENTS

| | | |
|---|---|---|
| 5,159,513 | 10/1992 | Dieny et al. . |
| 5,408,377 * | 4/1995 | Gurney et al. ........................ 360/325 |
| 5,465,185 | 11/1995 | Heim et al. . |
| 5,515,221 * | 5/1996 | Gill et al. .............................. 360/319 |
| 5,650,887 | 7/1997 | Dovek et al. . |
| 5,748,399 | 5/1998 | Gill . |
| 5,751,521 * | 5/1998 | Gill ....................................... 360/314 |
| 5,768,069 | 6/1998 | Mauri . |
| 5,935,644 * | 8/1999 | Heim et al. ........................... 427/116 |
| 6,055,130 * | 4/2000 | Dorius et al. ........................ 360/236.3 |
| B1 6,175,476 * | 1/2001 | Haui et al. .......................... 360/324.11 |
| B1 6,185,078 * | 2/2001 | Lin et al. ............................ 360/324.12 |
| B1 6,191,926 * | 2/2001 | Everitt et al. ...................... 360/324.11 |
| B1 6,201,673 * | 3/2001 | Rottmayer et al. ............... 360/324.12 |

\* cited by examiner

*Primary Examiner*—David L. Ometz
*Assistant Examiner*—Franklin D. Altman, III
(74) *Attorney, Agent, or Firm*—Ervin F. Johnston

(57) ABSTRACT

A triple antiparallel (AP) coupled free layer structure is located between first and second pinned layer structures in a dual spin valve sensor. The triple AP coupled free layer structure includes first, second and third antiparallel (AP) coupled ferromagnetic free layers and nonmagnetic first and second antiparallel (AP) coupling layers. The first AP coupling layer is located between and interfaces the first and second AP coupled free layers and the second AP coupling layer is located between and interfaces the second and third AP coupled free layers. Magnetic moments of the first and third AP coupled free layers are parallel with respect to one another and, because of a strong antiparallel coupling, the second AP coupled free layer pins magnetic moments of the first and third AP coupled free layers antiparallel thereto. In a preferred embodiment the first and third AP coupled free layers are cobalt based for promoting a high magnetoresistance of the sensor and the second AP coupled free layer is nickel iron based for promoting sensitivity of the free layer structure to signal fields.

33 Claims, 8 Drawing Sheets

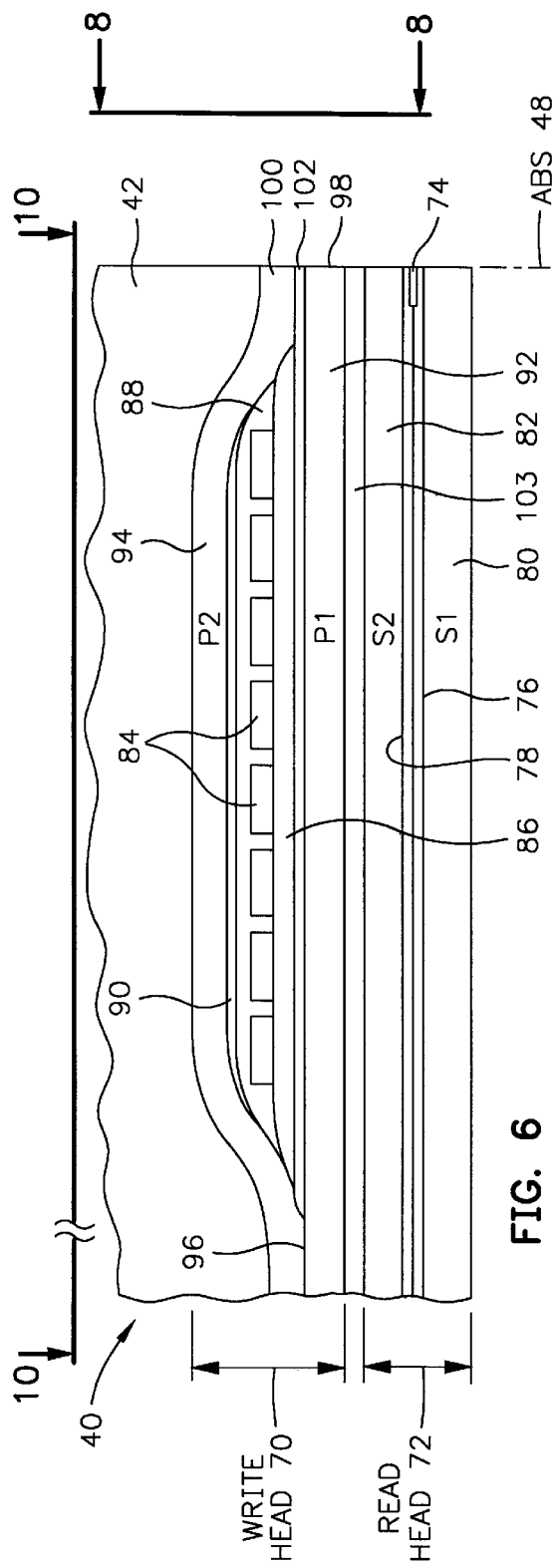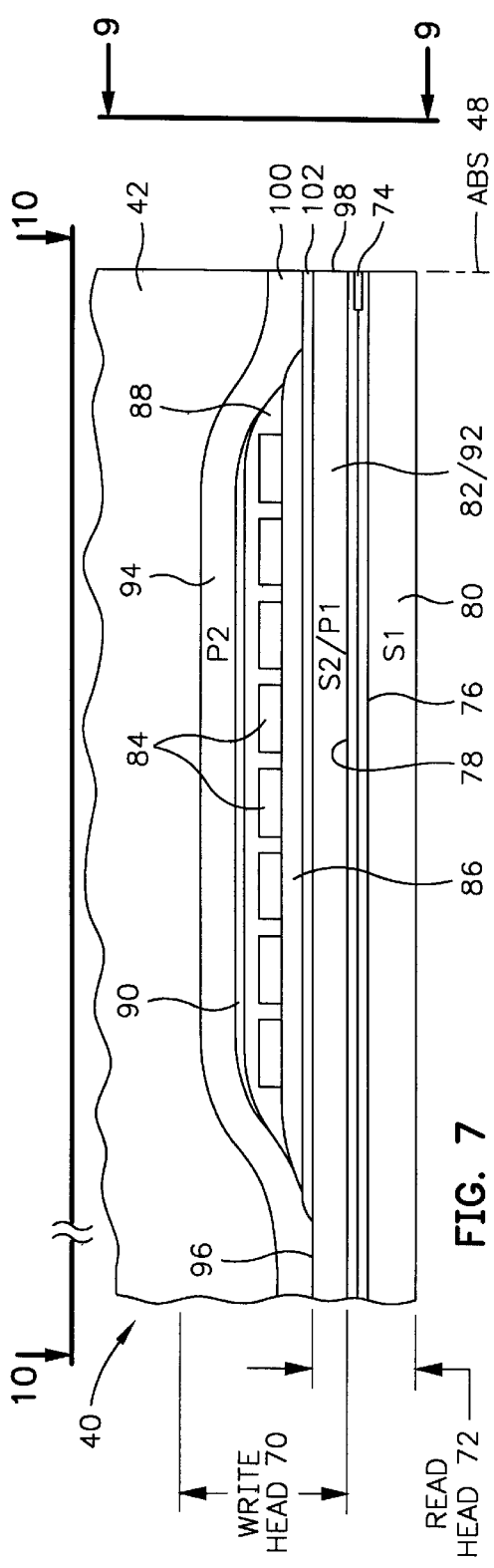

(ABS)

READ HEAD SPIN VALVE SENSOR WITH TRIPLE ANTIPARALLEL COUPLED FREE LAYER STRUCTURE

BACKGROUND OF THE INVENTION

1. Field of the Invention

The present invention relates to a read head spin valve sensor that has a triple antiparallel (AP) coupled free layer structure and more particularly to such a free layer structure which has first and second cobalt based layers for increasing a magnetoresistive coefficient of the read head and a nickel iron based layer between the cobalt based layers for increasing responsiveness of the read head to signal fields.

2. Description of the Related Art

A spin valve sensor is employed by a read head for sensing magnetic fields on a moving magnetic medium, such as a rotating magnetic disk. A typical sensor includes a nonmagnetic electrically conductive first spacer layer sandwiched between a ferromagnetic pinned layer structure and a ferromagnetic free layer structure. An antiferromagnetic pinning layer interfaces and is exchange coupled to the pinned layer structure for pinning a magnetic moment of the pinned layer structure 90° to an air bearing surface (ABS) where the ABS is an exposed surface of the sensor that faces the rotating disk. First and second leads are connected to the spin valve sensor for conducting a sense current therethrough. A magnetic moment of the free layer structure is typically oriented parallel to the ABS in a quiescent condition, the quiescent condition being where the sense current is conducted through the sensor in the absence of any signal fields. The magnetic moment of the free layer structure is free to rotate from the parallel position in response to signal fields from the rotating magnetic disk.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with respect to the pinned layer structure and the free layer structure. When the magnetic moments of the pinned and free layer structures are parallel with respect to one another scattering is minimal and when their magnetic moments are antiparallel scattering is maximized. Changes in scattering, in response to field signals from the rotating disk, changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in resistance of the sensor between parallel and antiparallel orientations of the pinned and free layer structures and R is the resistance of the sensor when the moments are parallel.

The pinned layer structure may be a simple pinned layer structure or an antiparallel (AP) pinned layer structure. The simple pinned layer structure is a single ferromagnetic layer which may comprise one or more ferromagnetic films. The AP pinned layer structure comprises a nonmagnetic antiparallel (AP) coupling layer located between and interfacing ferromagnetic first and second antiparallel (AP) pinned layers. In the AP pinned layer structure one of the AP pinned layers is pinned by the pinning layer and the other AP pinned layer is strongly antiparallel coupled to the pinned AP pinned layer through the AP coupling layer. Accordingly, the magnetic moments of the first and second AP pinned layers are antiparallel with respect to each other. The AP pinned layer structure is fully described in commonly assigned U.S. Pat. No. 5,465,185 which is incorporated by reference herein.

A spin valve sensor is also classified as a single spin valve sensor or a dual spin valve sensor. In a single spin valve sensor only one pinned layer structure and one pinning layer are employed wherein the pinned layer structure is separated from the free layer structure by only one spacer layer. A dual spin valve sensor employs a ferromagnetic free layer structure which is located between first and second ferromagnetic pinned layer structures wherein a first spacer layer separates the first pinned layer structure from the free layer structure and a second spacer layer separates the second pinned layer structure from the free layer structure. The first and second pinned layer structures are pinned by first and second antiferromagnetic pinning layers. In comparison to the single spin valve sensor the magnetoresistive coefficient of the dual spin valve sensor is increased by a factor of approximately 1.4 due to the spin valve effect on each side of the free layer structure.

In either the single or dual spin valve sensor the magnetic spins of the single or dual pinning layer structures must be set so as appropriately pin the magnetic moment of the respective pinned layer structure. This is accomplished by raising the temperature of the sensor at or above the blocking temperature of the pinning or pinning layers in the presence of a field that is oriented perpendicular to the ABS. The field orients the magnetic moment of the one or more pinned layer structures perpendicular to the ABS. The blocking temperature is the temperature at which all of the magnetic spins of the pinning layer align with the orientation of the magnetic moment of the pinned layer structures at their interface. When the sensor cools the magnetic spins of the pinning layer are set perpendicular to the ABS and pin the magnetic moment of the pinned layer structure perpendicular to the ABS. After fabrication and installation in a disk drive a portion or all of the magnetic spins of a pinning layer may become disoriented due to imposition of a magnetic field in the presence of heat from the drive or from an electrostatic discharge (ESD). Upon this occurrence it is important that the sensor permit the magnetic spins to be reset by employing a current pulse through the sense current circuit that will produce the required sense current fields in the presence of heat for resetting the one or more pinning layer structures.

A transfer curve (readback signal of the spin valve head versus applied signal from the magnetic disk) of both the single or dual spin valve sensor is a substantially linear portion of the aforementioned function of $\cos \theta$. The greater this angle, the greater the resistance of the spin valve to the sense current and the greater the readback signal (voltage sensed by processing circuitry). With positive and negative signal fields from a rotating magnetic disk (assumed to be equal in magnitude), it is important that positive and negative changes of the resistance of the spin valve sensor be equal in order that the positive and negative magnitudes of the readback signals are equal. When this occurs a bias point on the transfer curve is considered to be zero and is located midway between the maximum positive and negative readback signals. When the direction of the magnetic moment of the free layer is parallel to the ABS in the quiescent state the bias point is located at zero and the positive and negative readback signals are equal when sensing positive and negative signal fields from the magnetic disk. The readback signals are then referred to in the art as having symmetry about the zero bias point. When the readback signals are not equal the readback signals are asymmetric which equates to reduced storage capacity of a magnetic disk drive.

The location of the bias point on the transfer curve is influenced by three major forces on the free layer. In a single spin valve sensor these forces are a demagnetization field ($H_D$) from the pinned layer structure, a ferromagnetic coupling field ($H_F$) between the pinned layer structure and the free layer structure, and sense current fields ($H_I$) from all conductive layers of the spin valve except the free layer. When the sense current is conducted through the spin valve sensor, the pinning layer (if conductive), the pinned layer structure and the first spacer layer, which are all on one side of the free layer structure, impose sense current fields on the free layer structure that rotate the magnetic moment of the free layer in a first direction. The ferromagnetic coupling field from the pinned layer further rotates the magnetic moment of the free layer in the first direction. The demagnetization field from the pinned layer on the free layer rotates the magnetic moment of the free layer in a second direction opposite to the first direction. Accordingly, the demagnetization field opposes the sense current and ferromagnetic coupling fields and can be used for counterbalancing. In a dual spin valve sensor each of the pinned layer structures exerts a demagnetization field ($H_D$) and a ferromagnetic coupling field ($H_F$) on the free layer structure and there are additional sense current fields exerted on the free layer structure. The mode of balancing these fields in order to establish a zero bias point for the free layer structure is now different than the single spin valve sensor and needs to be carefully analyzed in order to obtain the required balance and enable reset if the magnetic spins of the pinning layers become disoriented.

Over the years a significant amount of research has been conducted to improve the magnetoresistive coefficient dr/R of spin valve sensors without adversely affecting other performance factors such as biasing of the free layer and thermal stability of the pinning layers. These efforts have increased the storage capacity of computers from kilobytes to megabytes to gigabytes.

SUMMARY OF THE INVENTION

I have provided a dual spin valve sensor which employs a triple antiparallel (AP) free layer structure. The AP free layer structure employs ferromagnetic first, second and third antiparallel (AP) coupled layers and nonmagnetic first and second antiparallel (AP) coupling layers. The first AP coupling layer is located between and interfaces the first and second AP coupled layers and the second AP coupling layer is located between and interfaces the second and third AP coupled layers. The coupling layers are typically made of ruthenium (Ru). A primary advantage of this free layer structure is that the first and third AP coupled layers may be made of a material, such as cobalt (Co) or cobalt iron (CoFe), that promotes the magnetoresistive coefficient and the second AP coupled layer, which is in the middle, can be made of a more magnetically soft material such as nickel iron (NiFe). The magnetic moment of a cobalt based material is stiffer than the magnetic moment of a nickel iron based material and does not respond as well as a nickel iron based material to signal fields from a rotating magnetic disk. Accordingly, the outwardly located first and third AP coupled free layers are preferably thin layers of a cobalt based material and the middle second layer is a thicker layer of a nickel iron based material. In a preferred embodiment the magnetic thickness of the middle located nickel iron based AP coupled free layer is thicker than a total magnetic thickness of the outwardly located first and third cobalt based AP coupled free layers. With this arrangement the middle located nickel iron based layer controls the rotation of the free layer structure in response to signal fields from the rotating magnetic disk. An AP coupled free layer structure is fully described in commonly assigned U.S. Pat. No. 5,768,069 which is incorporated by reference herein.

Employment of the triple AP coupled free layer structure has another distinct advantage. In high recording densities of the future, the prior art single free layer may be required to be as thin as 20 Å of nickel iron (NiFe) in order to match it with low moment signal fields from the rotating magnetic disk. Unfortunately, this thickness is too thin to provide optimized magnetoresistance between the free and pinned layers. The thickness of the free layer for optimizing the magnetoresistive signal is largely governed by the longer of the spin-up and spin-down electron mean free paths within the ferromagnetic layers which is typically about 50 Å. Layers thinner than the optimal thickness do not permit electrons to travel as far which reduces the magnetoresistive coefficient dr/R (magnetoresistance). With the triple AP coupled free layer structure it is only necessary that the net magnetic moment of the free layer structure be matched to the moment of the signal field. Accordingly, in the dual spin valve sensor, each of the outside cobalt based AP coupled free layers may be thin and the middle nickel iron based AP coupled free layer may be minimally thicker so that the net magnetic moment is small. For instance, each of the outside cobalt based AP coupled free layers may have a magnetic thickness of 10 Å and the middle nickel iron based AP coupled free layer may have a magnetic thickness of 30 Å. This provides optimized magnetoresistance on each side of the free layer structure while providing a net moment of the free layer structure of only 10 Å of nickel iron (NiFe) which can match future requirements of low moment signals from the rotating magnetic disk.

In a further preferred embodiment, one of the pinned layer structures is a double antiparallel (AP) pinned layer structure and the other pinned layer structure is a triple antiparallel (AP) pinned layer structure. In the double AP pinned layer structure a nonmagnetic antiparallel (AP) coupling layer is located between an interfaces ferromagnetic first and second antiparallel (AP) pinned layers. In the triple antiparallel (AP) a first nonmagnetic antiparallel (AP) coupling layer is located between ferromagnetic first and second antiparallel (AP) pinned layers and a second nonmagnetic antiparallel (AP) coupling layer is located between and interfaces the second AP pinned layer and a third ferromagnetic antiparallel (AP) pinned layer. With proper sizing of the ferromagnetic layers of the double and triple AP pinned layer structures net magnetic moments of the pinned layer structures can completely counterbalance each other so as to have no influence on the bias point of the sensor. With still further sizing of the ferromagnetic layers of the double and triple AP pinned layer structures the ferromagnetic coupling fields of the pinned layer structures, which are additive, can completely counterbalance the sense current field for achieving the desirable zero bias point. The triple AP coupled free layer structure in combination with the double and triple AP pinned layer structures provide considerable flexibility in establishing the zero bias point. An AP coupled pinned layer structure is fully described in commonly assigned U.S. Pat. No. 5,465,185 which is incorporated by reference herein.

It should be noted that the first and second pinning layers pin the first AP coupled pinned layers of the double and triple AP pinned layer structures perpendicular to the ABS in an antiparallel relationship. Because of the antiparallel coupling in the AP pinned layer structures this causes the magnetic moments of the second AP pinned layer of the double AP pinned layer structure and the third AP pinned layer of the triple AP pinned layer structure to be parallel with respect to one another. Accordingly, the desired in-phase relationship between the free layer structure and a respective pinned layer structure is obtained by the aforementioned process of setting the magnetic spins of the first and second pinning layers.

Another advantage of the double and triple AP pinned layer structures is that the magnetic spins of the pinning layers can be reset in a disk file should the magnetic spins or a portion thereof become disoriented as described hereinabove. A current pulse conducted through the conductive layers of the spin valve sensor via the sense current circuit will cause magnetic fields on the first and second pinned layer structures from other conductive layers of the sensor. These fields set the magnetic spins of the first and second pinning layers. A current pulse sufficient to raise the temperature of the spin valve sensor to the blocking temperature of the materials of the first and second pinning layers will provide the necessary heat to permit the current fields from the conductive layers of the sensor to implement a proper setting of the magnetic spins of the pinning layers.

An object of the present invention is to provide a free layer structure for a dual spin valve sensor of a read head that has an improved magnetoresistance and improved sensitivity to low signal fields from a rotating magnetic disk.

Another object is to provide a dual spin valve sensor wherein net demagnetization fields from pinned layer structures completely counterbalance one another and sense current fields can be employed for completely counterbalancing ferromagnetic coupling fields.

A further object is to provide a free layer structure for a dual spin valve sensor wherein a spin valve effect is optimized on each side of the free layer structure with first and second cobalt based layers and responsiveness of the free layer structure to signal fields is optimized by a nickel based layer located between the cobalt based layers.

Still another object is to provide a dual spin valve sensor with a free layer structure which optimizes magnetoresistance and moment matching of the media.

Still a further object is to provide a dual spin valve sensor which promotes symmetry of a read signal, which can be reset in a magnetic disk drive and which promotes high magnetoresistance and recording densities.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
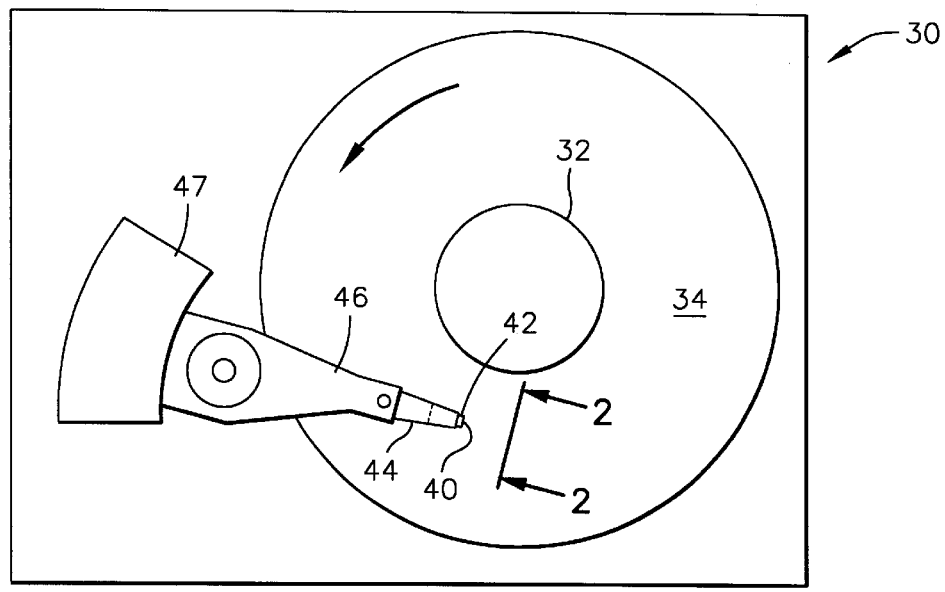
FIG. 1 is a planar view of an exemplary magnetic disk drive.
Figure 2:
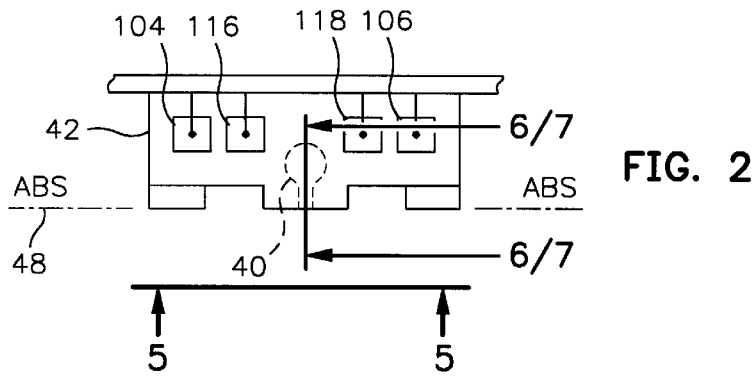
FIG. 2 is an end view of a slider with a magnetic head of the disk drive as seen in plane 2—2.
Figure 3:
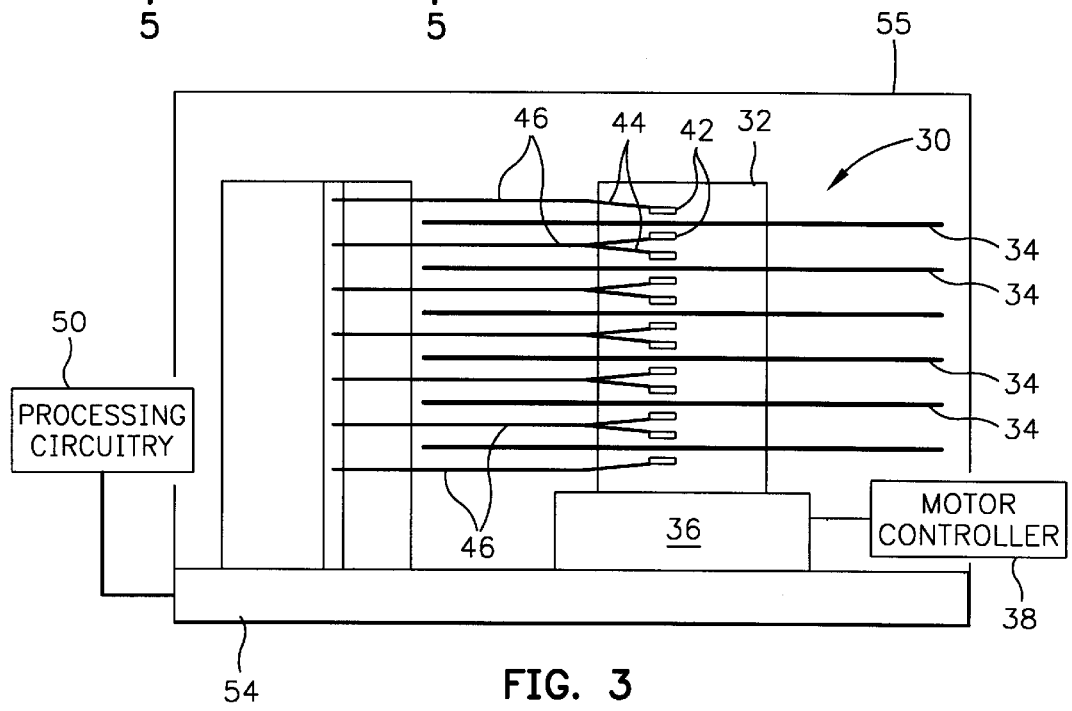
FIG. 3 is an elevation view of the magnetic disk drive wherein multiple disks and magnetic heads are employed.
Figure 4:
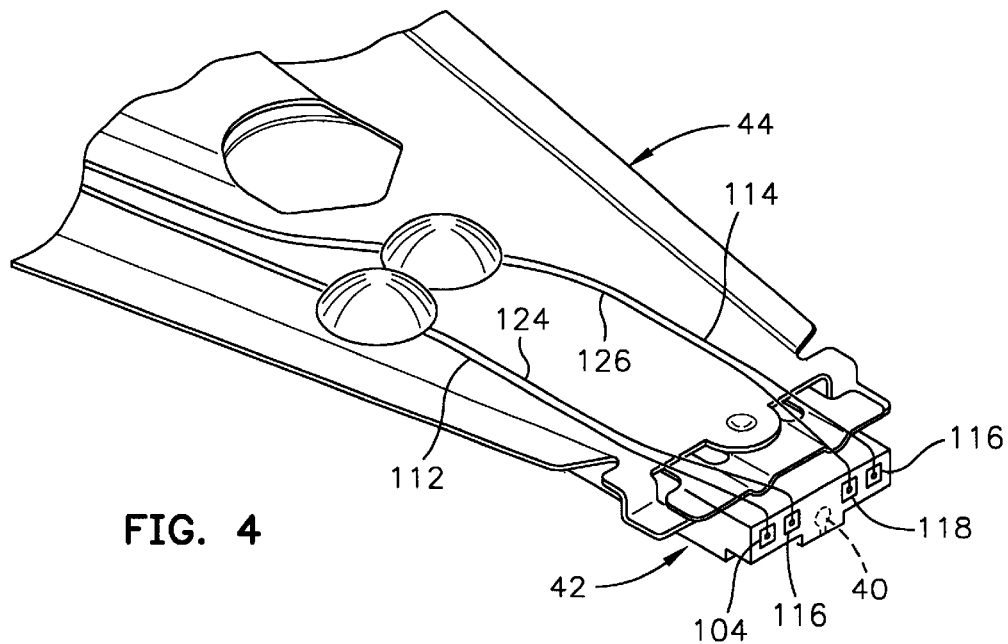
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
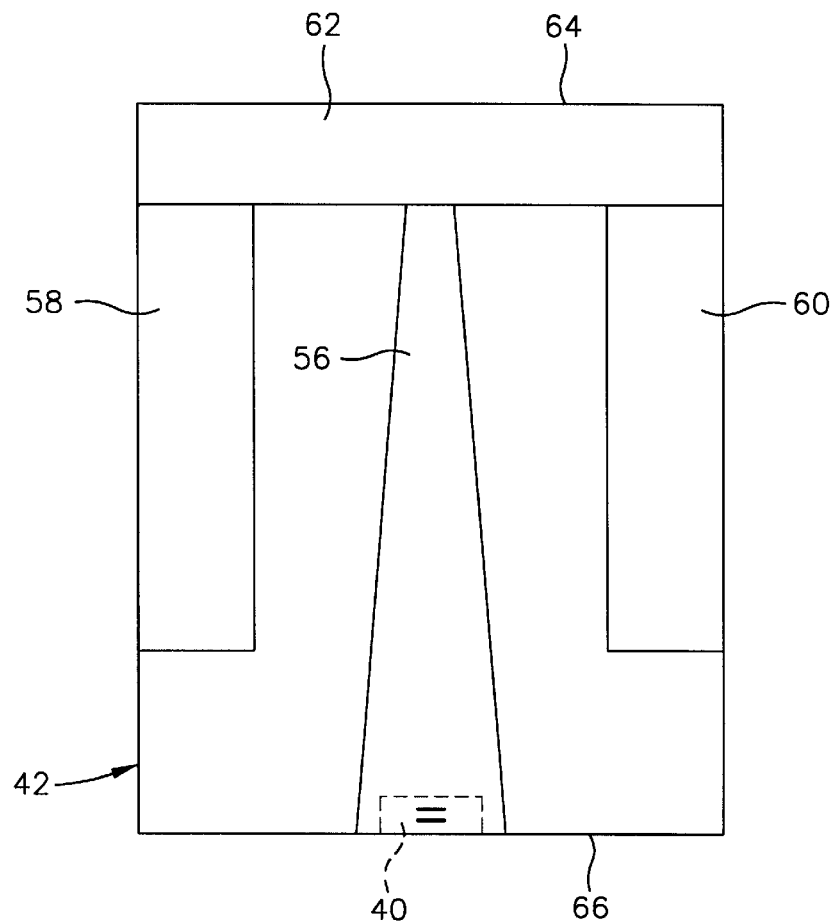
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
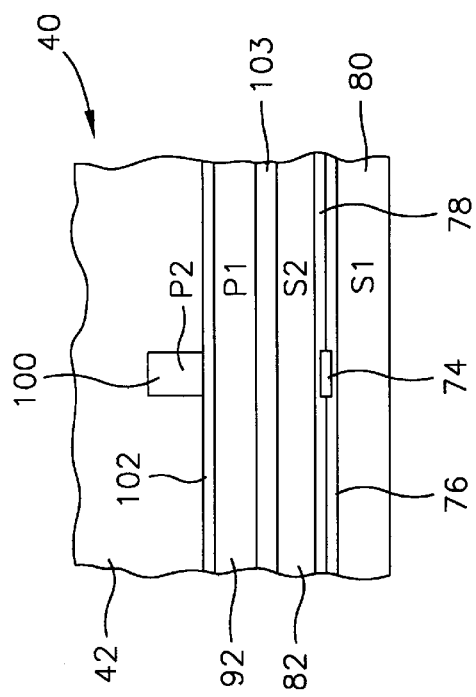
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes.

These potential changes are then processed as readback signals by the processing circuitry 50 shown in FIG. 3.

Figure 10:
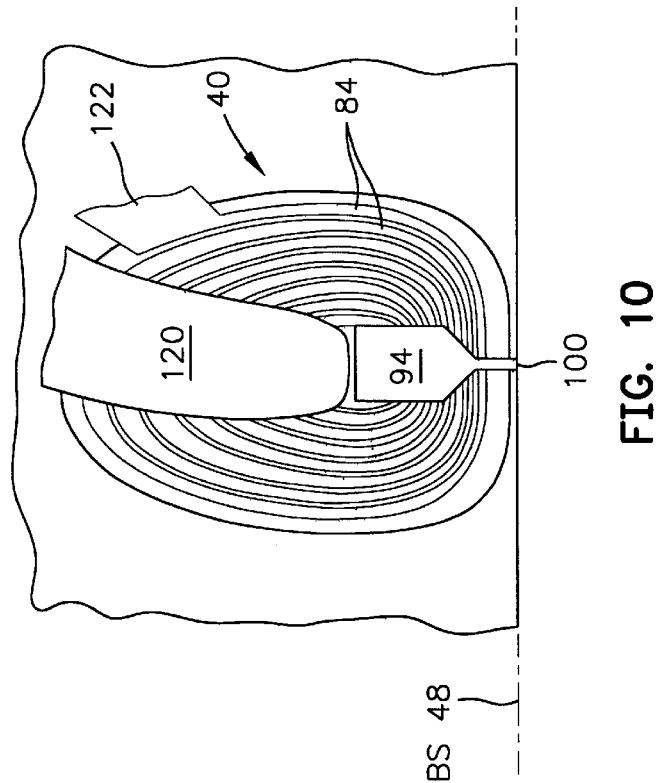
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
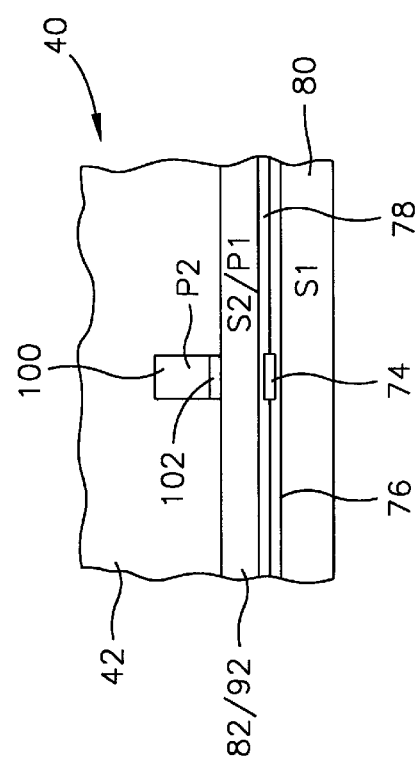
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
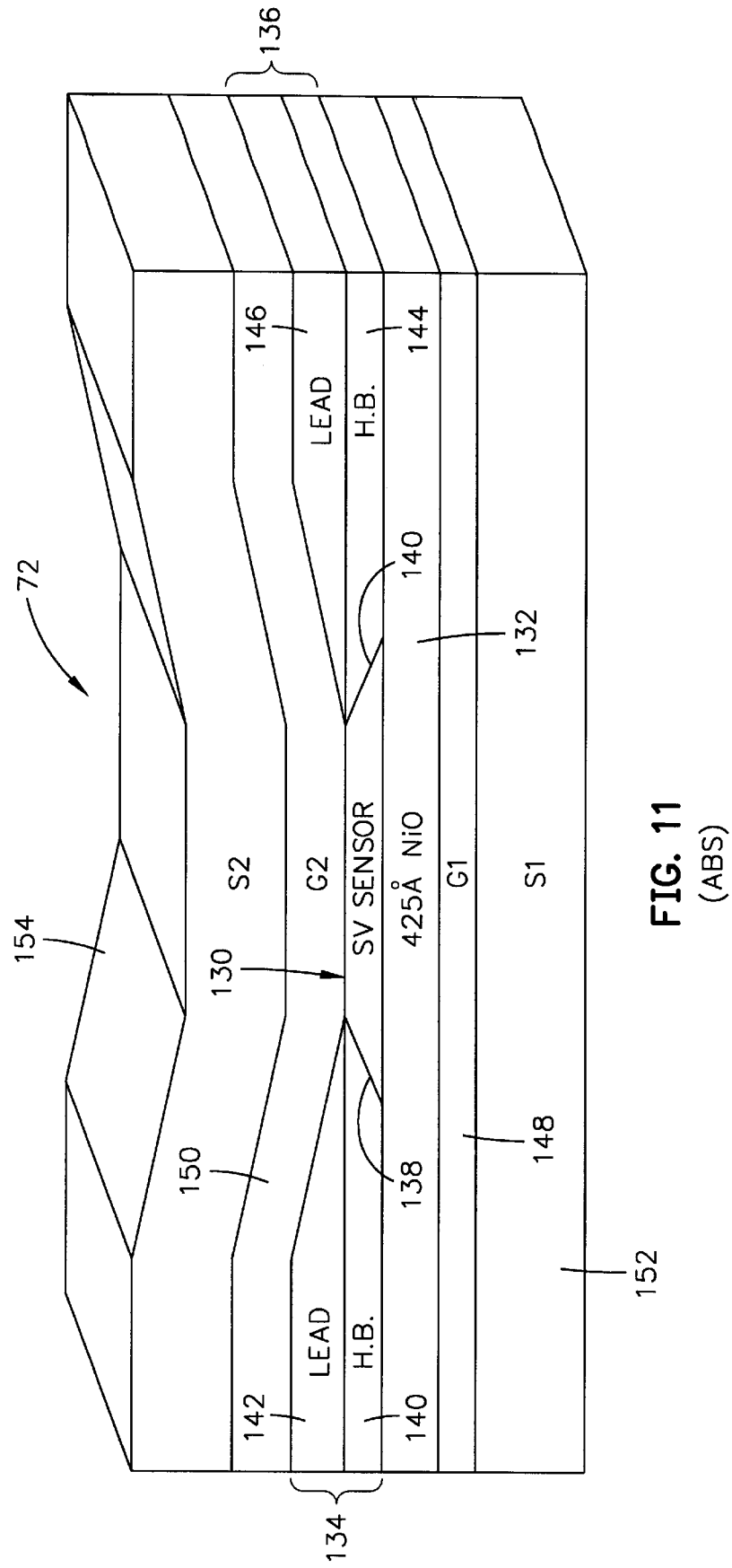
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. The spin valve sensor 130 has a pinned layer structure, to be described hereinafter, which has a magnetic moment that is pinned by an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
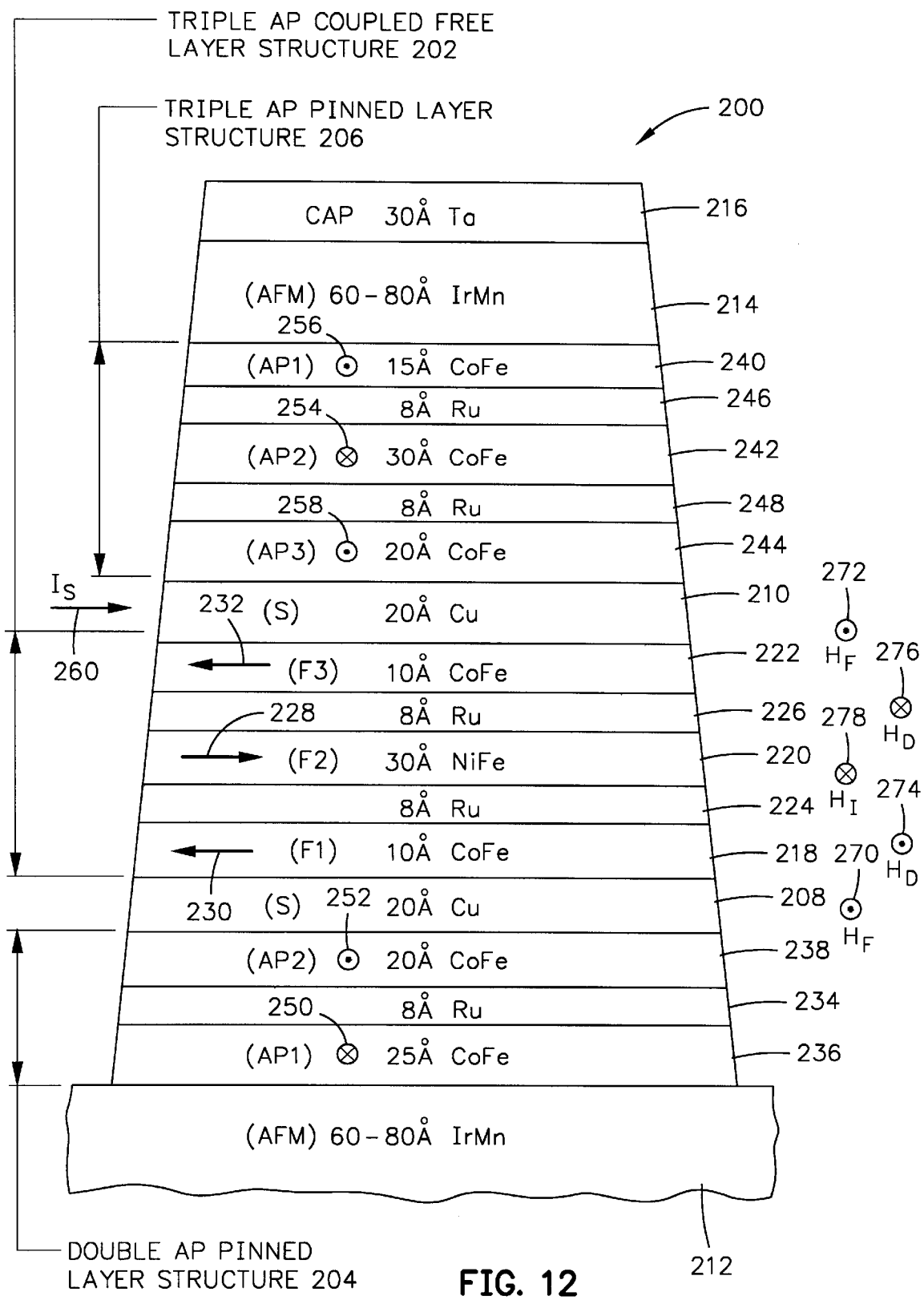
FIG. 12 is an air bearing surface (ABS) illustration of a first embodiment of the present spin valve sensor.

The first embodiment 200 of the present spin valve sensor is shown in FIG. 12 which includes a triple antiparallel (AP) free layer structure 202 which is located between first and second antiparallel (AP) pinned layer structures 204 and 206. A nonmagnetic conductive first spacer layer 208 is located between the first AP pinned layer structure 204 and the triple AP coupled free layer structure 202 and a nonmagnetic conductive second spacer layer 210 is located between the AP pinned layer structure 206 and the triple AP coupled free layer structure 202. An antiferromagnetic (AFM) first pinning layer 212 pins a magnetic moment of the first pinned layer structure 204, which will be described in more detail hereinafter, and an antiferromagnetic (AFM) second pinning layer 214 pins a magnetic moment of the second pinned layer structure 206, which will be described in more detail hereinafter. A cap layer 216 is on the second pinning layer 214 for protecting it from subsequent processing steps.

The triple AP coupled free layer structure 202 includes ferromagnetic first, second and third antiparallel (AP) coupled free layers (F1) 218, (F2) 220 and (F3) 222. A nonmagnetic first antiparallel (AP) coupling layer 224 is located between the first and second AP coupled free layers 218 and 220 and a nonmagnetic second antiparallel (AP) coupling layer 226 is located between the second and third AP coupled free layers 220 and 222. Because of a strong antiparallel exchange coupling the AP coupled free layer 220 has a magnetic moment 228 which is oriented antiparallel to magnetic moments 230 and 232 of the first and third AP coupled free layers 218 and 222. When the magnetic moments 228, 230 and 232 are parallel to the ABS, as shown in FIG. 12, the bias point of the spin valve sensor is at a zero position on the transfer curve of the sensor. The magnetic moments 228, 230 and 232, which optionally could be reversed in their directions, will be discussed in more detail hereinafter.

In the preferred embodiment the first AP pinned layer structure 204 is a double AP pinned layer structure and the second AP coupled free layer structure 202 is a triple AP coupled free layer structure. In this arrangement the first AP pinned layer structure 204 includes a nonmagnetic conductive antiparallel (AP) coupling layer 234 which is located between ferromagnetic first and second antiparallel (AP) pinned layers 236 and 238 and the triple AP coupled free layer structure 202 includes ferromagnetic first, second and third antiparallel (AP) pinned layers (AP1) 240, (AP2) 242 and (AP3) 244 with a nonmagnetic conductive first antiparallel (AP) coupling layer 246 between the first and second AP pinned layers 240 and 242 and a nonmagnetic conductive second antiparallel (AP) coupling layer 248 between the second and third AP pinned layers 242 and 244. By strong antiparallel exchange coupling the first and second AP pinned layers 236 and 238 have magnetic moments 250 and 252 which are antiparallel with respect to one another and by a strong antiparallel exchange coupling the AP pinned layer 242 has a magnetic moment 254 which is antiparallel to magnetic moments 256 and 258 of the first and third AP pinned layers 240 and 244.

The magnetic moments 250, 252, 254, 256 and 258 are oriented perpendicular to the ABS and their direction either toward the ABS or away from the ABS is determined by the orientations of the magnetic spins of the pinning layers 212 and 214. In the preferred embodiment the orientation of the magnetic spins of the first and second pinning layers 212 and 214 is determined by the direction of the sense current $I_S$ which, for example, is from left to right. During fabrication of the spin valve sensor 200 the easy axes of the AP coupled pinned layers 236, 238, 240, 242 and 244 are oriented perpendicular to the ABS. This can be accomplished by sputter depositing these layers in the presence of a field which is directed perpendicular to the ABS. In a similar manner, the easy axes of the first, second and third AP coupled free layers 218, 220 and 222 are oriented parallel to the ABS. This is accomplished by sputter depositing these layers in the presence of a field which is parallel to the ABS.

The orientations of the magnetic spins of the first and second pinning layers 212 and 214 are set by conducting a current pulse through the sense current circuit which is approximately three times the normal sense current $I_S$ for a period of approximately 5 minutes. A typical current pulse would have a voltage of approximately 0.09 volts. This will cause a sufficient heating of the sensor to raise the temperature of the pinning layers 212 and 214 to or above their blocking temperatures which, in combination with appropriately directed sense current fields, will implement the setting. With the arrangement shown in FIG. 12 a reset current pulse directed in the same direction as the sense current $I_S$ will cause the magnetic moment 250 to be directed away from the ABS and the magnetic moment 256 to be directed toward the ABS. Accordingly, the magnetic moment 252 will be directed toward the ABS, the magnetic moment 254 will be directed away from the ABS and the magnetic moment 258 will be directed toward the ABS. The magnetic moment 250 causes the magnetic spins of the pinning layer 212 to be oriented away from the ABS and the magnetic moment 256 causes the magnetic spins of the pinning layer 214 to be directed toward the ABS. Upon termination of the current pulse the sensor cools and the magnetic spins of the first and second pinning layers 212 and 214 are set in place to pin the magnetic moment 250 away from the ABS and the magnetic moment 256 toward the ABS by exchange coupling at the interfaces of these layers.

Exemplary thicknesses and materials for the layers of the spin valve sensor 200 are 25 Å of cobalt iron (CoFe) for the first AP pinned layer 236, 8 Å of ruthenium (Ru) for the AP coupling layer 234, 20 Å of cobalt iron (CoFe) for the second AP pinned layer 238, 20 Å of copper (Cu) for the first spacer layer 208, 10 Å of cobalt iron (CoFe) for the first AP coupled free layer 218, 8 Å of ruthenium (Ru) for the first AP coupling layer 224, 30 Å of nickel (NiFe) for the second AP coupled free layer 220, 8 Å of ruthenium (Ru) for the second AP coupling layer 226, 10 Å of cobalt iron (CoFe) for the third AP coupled free layer 222, 20 Å of copper (Cu) for the second spacer layer 210, 20 Å of cobalt iron (CoFe) for the third AP pinned layer 244, 8 Å of ruthenium (Ru) for the second AP coupling layer 248, 30 Å of cobalt iron (CoFe) for the second AP pinned layer 242, 8 Å of ruthenium (Ru) for the second AP coupling layer 246, 15 Å of cobalt iron (CoFe) for the first AP pinned layer 240 and 30 Å of tantalum (Ta) for the cap layer 216. All of the ferromagnetic layers, except the second AP coupled free layer 220, are preferably cobalt iron (CoFe), but optionally may be cobalt (Co) or another cobalt based material. The thicknesses of the ferromagnetic layers are equivalent magnetic thicknesses of nickel iron (NiFe). Accordingly, the thickness of 30 Å for the second AP coupled free layer 220 is an actual thickness while the actual thicknesses of the cobalt iron (CoFe) layers would be less than that shown in FIG. 12. Since the magnetic moment of cobalt iron (CoFe) is approximately 1.7 times the magnetic moment of nickel iron (NiFe) the thicknesses shown for the cobalt iron (CoFe) layers in FIG. 12 would be divided by 1.7 in order to determine the actual thickness.

A primary advantage of the triple coupled AP coupled free layer structure 202 is that the first and third AP coupled free layers 218 and 222 can be cobalt based for improving the magnetoresistance of the spin valve sensor. A cobalt based layer adjacent one of the spacer layers 208 and 210 improves the spin valve effect or magnetoresistance as compared to nickel iron (NiFe) adjacent the spacer layer. However, a cobalt based layer is less sensitive to a signal field from a rotating magnetic disk as compared to a nickel iron (NiFe) layer. Accordingly, the second AP coupled free layer 220 is nickel iron (NiFe). The net equivalent magnetic thickness, which determines the sensitivity of the free layer structure 202 to signal fields from a rotating magnetic disk, is 10 Å of nickel iron (NiFe) for the embodiment shown in FIG. 12. In lieu of employing 30 Å of nickel iron (NiFe) for the second AP coupled free layer 220, the same result can be achieved when the second AP coupled free layer 220 is 17.65 Å of cobalt iron (CoFe).

A second advantage of the triple AP coupled free layer structure 202 is that it provides additional flexibility in obtaining a desirable low net magnetic moment so that it is highly responsive to signal fields from the rotating magnetic disk. With the structure shown in FIG. 12 the second AP coupled free layer 220 controls the rotation of the triple AP coupled free layer structure 202. For instance, if a signal field is directed toward the ABS the magnetic moment 228 will be rotated away from the ABS while the magnetic moments 230 and 232 will be rotated toward the ABS. In the preferred embodiment the magnetic moment 228 is greater than the sum of the magnetic moments 230 and 232. With this arrangement the first and third AP coupled free layers 218 and 222 are thinner than if their magnetic moments, when combined, were greater than the magnetic moment 228. When the first and second AP coupled free layers 218 and 222 are thinner there will be greater ferromagnetic coupling fields 270 and 272 which will be described in more detail hereinafter.

With the thicknesses and directions of the magnetic moments of the ferromagnetic layers of the AP pinned layer structures 204 and 206, the AP pinned layer structure 204 has a net equivalent magnetic moment of 5 Å directed into the sensor and the AP pinned layer structure 206 has a net equivalent magnetic moment of 5 Å directed out of the sensor. Accordingly, the AP pinned layer structure 204 exerts a demag field $H_D$ 274 on the free layer structure 202 and the AP pinned layer structure 206 exerts a demag field $H_D$ 276 on the free layer structure 202. Since these demag fields are equal and in opposite directions they cancel each other so as to have no effect on the bias point of the spin valve sensor. Since the magnetic moment 252 of the second AP pinned layer is directed out of the sensor the ferromagnetic coupling field on the first AP coupled free layer 218 is directed parallel as shown at 270. Since the magnetic field 258 of the third AP pinned layer 244 is directed out of the sensor the ferromagnetic coupling field on the third AP coupled free layer 222 is directed parallel as shown at 272. Accordingly, the ferromagnetic coupling fields 270 and 272 are additive. However, since the thicknesses of conductive layers above the triple AP coupled free layer structure 202 is greater than the thicknesses of the conductive layers therebelow, the sense current 260 will cause a sense current field $H_I$ 278 which is directed perpendicular to the ABS and into the sensor. Accordingly, the ferromagnetic coupling fields 270 and 272 should be of such a magnitude so as to completely counterbalance the sense current field 278 so that these fields have no effect on the bias point of the spin valve sensor. With this arrangement the magnetic moments 228, 230 and 232 can be easily established parallel to the ABS, which equates to a zero bias point, which parallel position is further promoted by the hard bias layers 140 and 144 in FIG. 11. It can be seen from the arrangement of the ferromagnetic layers in FIG. 12 that there is great flexibility in achieving a zero bias point for the sensor as well as achieving high sensitivity to signal fields from a rotating magnetic disk.

Figure 13:
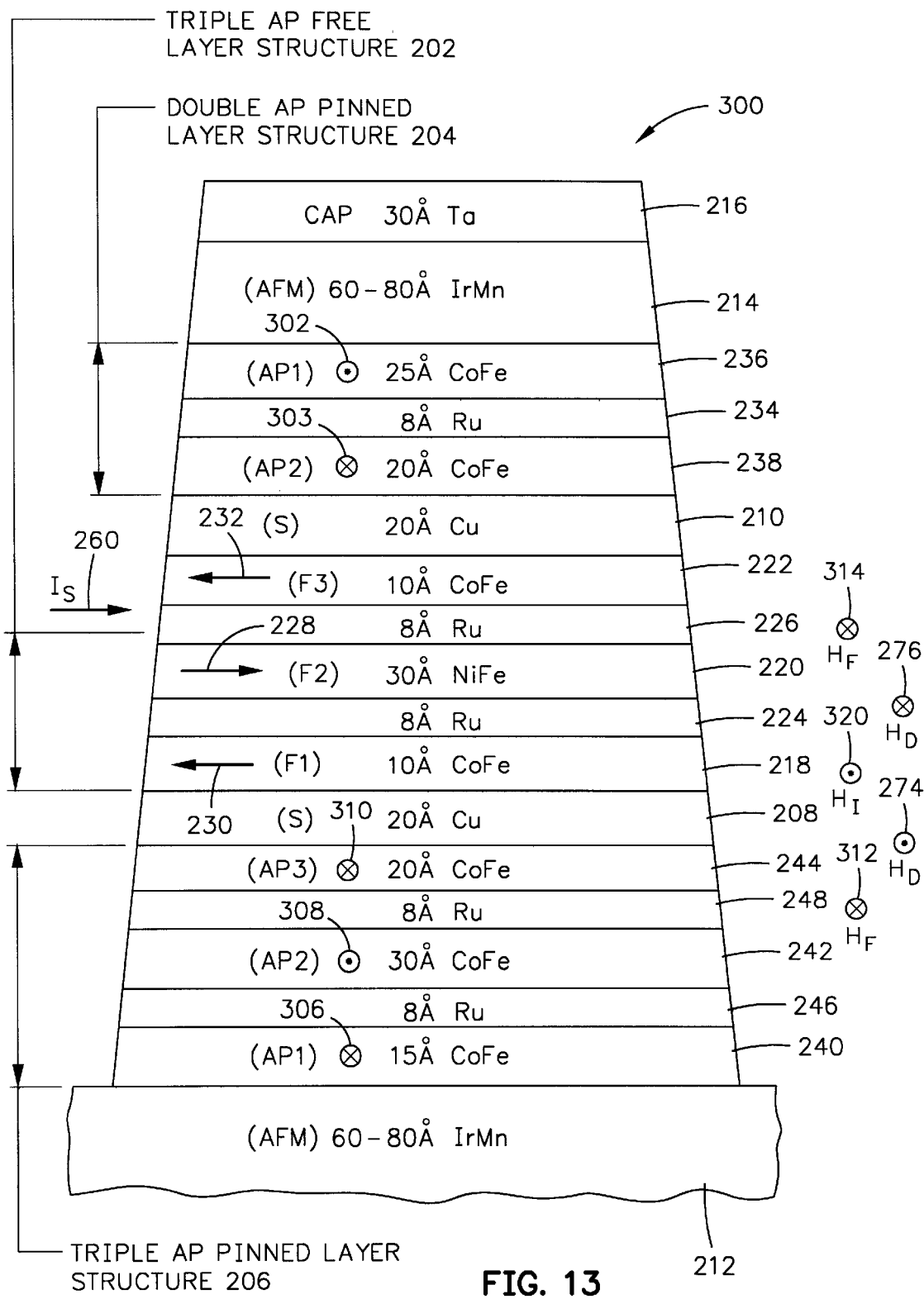
FIG. 13 is an ABS illustration of a second embodiment of the present spin valve sensor.

The embodiment 300 of the present invention shown in FIG. 13 operates similarly to the embodiment 200 shown in FIG. 12 except the AP pinned layer structure 206 is now below the AP free layer structure 202 and the AP pinned layer structure 204 is above the AP coupled free layer structure 202. With the sense current $I_s$ 260 in the same direction as in FIG. 12 the embodiment 300 in FIG. 13 will operate in the same manner as the embodiment 200 in FIG.

12. It can be seen from FIG. 13 that the magnetic moments 302 and 303 are antiparallel to the magnetic moments 250 and 252 in FIG. 12 and the magnetic moments 306, 308 and 310 are antiparallel to the magnetic moments 256, 254 and 258 in FIG. 12. The demagnetization fields $H_D$ 274 and 276 are the same as the magnetic moments 274 and 276 in FIG. 12, the ferromagnetic coupling fields 312 and 314 are antiparallel to the ferromagnetic coupling fields 270 and 272 in FIG. 12 and the net sense current field 320 is antiparallel to the net sense current field 278 in FIG. 12.

Figure 14:
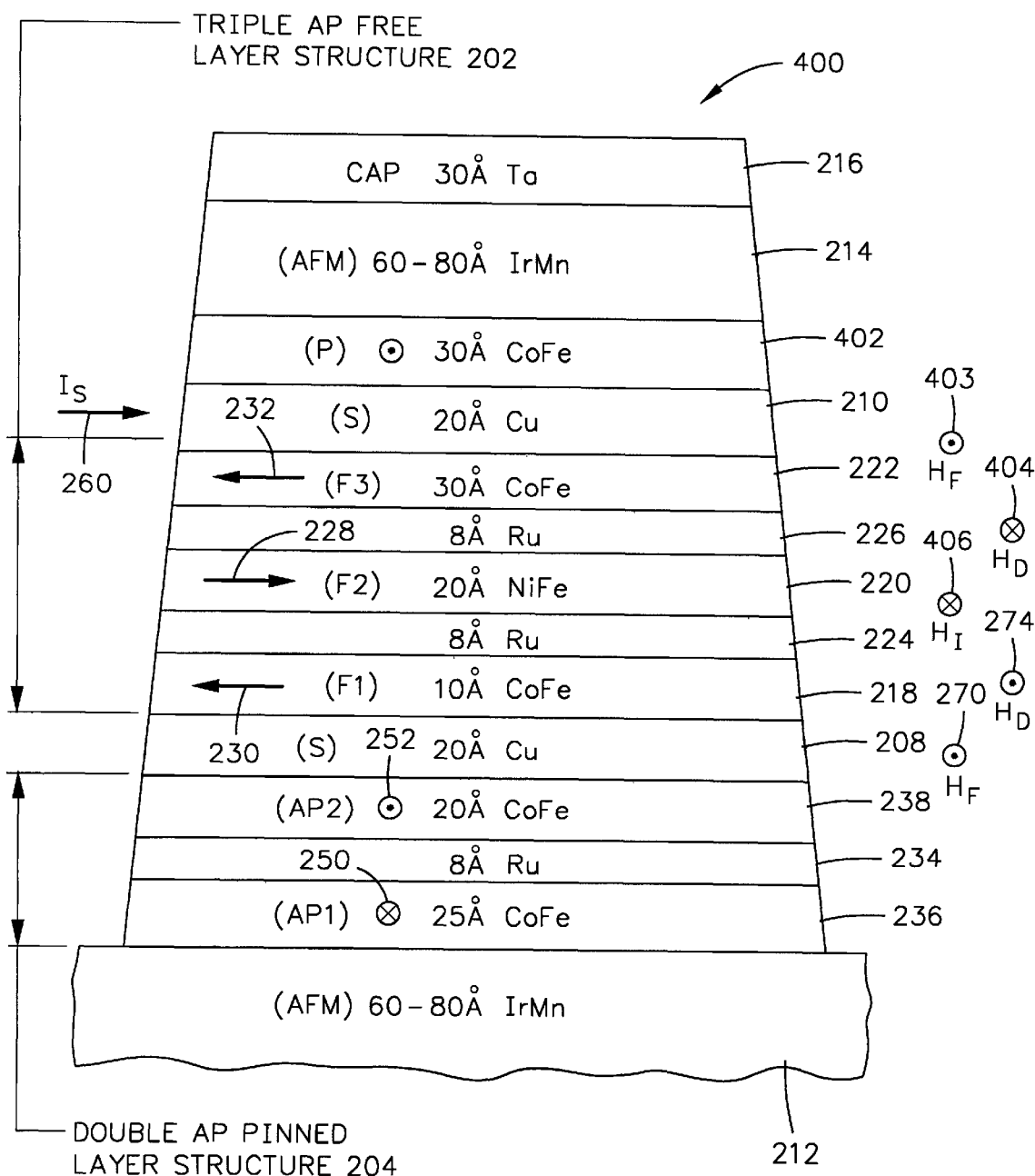
FIG. 14 is an ABS illustration of a third embodiment of the present spin valve sensor.

Another embodiment 400 of the present spin valve sensor is shown in FIG. 14, which is the same as the embodiment 200 shown in FIG. 12, except a single layer pinned layer 402 has been substituted for the triple AP pinned layer 206. This results in a lower ferromagnetic coupling field $H_F$ 403 and a higher demagnetization field $H_D$ 404 being exerted on the triple AP free layer structure 202. The net sense current field 406 will be antiparallel to the net sense current field 278 in FIG. 12 so as to be in the same direction as the ferromagnetic coupling fields 270 and 403. Accordingly, the demagnetization field 404 from the pinned layer 402 counterbalances the demagnetization field 274, the ferromagnetic coupling fields 270 and 402 and the sense current field 406. It can be seen that this arrangement is not as desirable as the preferred embodiments shown in FIGS. 12 and 13 since it would be more difficult to counterbalance all of the fields on the triple AP free layer structure 202 so as to achieve a zero bias with the magnetic moments 230, 228 and 232 parallel to the ABS. As a matter of interest, if the sense current field 260 in FIG. 14 is reversed in its direction the demagnetization fields 274 and 404, the ferromagnetic coupling fields 270 and 403 and the sense current field 406 would likewise be reversed in their directions. The same is true for the embodiments shown in FIGS. 12 and 13 without any change in their operation.

In a preferred embodiment the material of the first and second pinning layers 212 and 216 is the same with a low blocking temperature antiferromagnetic material, such as iridium manganese (IrMn). Alternatively, the first and second pinning layers 212 and 216 may be made of different materials which have low blocking temperatures. Other suitable materials are iron manganese (FeMn) which has a blocking temperature of 160° C. and a required thickness of 150 Å and nickel oxide (NiO) which has a blocking temperature from 215° C. to 225° C. and a required thickness of 425 Å. Iridium manganese (IrMn) is a desirable antiferromagnetic material because its required thickness is only 80 Å. However, iridium manganese (IrMn) has a higher blocking temperature of 250° C. to 260° C. Other suitable materials for the pinning layers are NiMn, PdMn, PtMn, PdPtMn and $RFe_2O_3$ where R is a rare earth element or Yttrium. Whatever the blocking temperature, it is within the skill of one ordinarily skilled in the art to determine the current and the pulse duration required to be conducted through the sense current $I_S$ circuit for meeting or exceeding the blocking temperature of the pinning layer for setting the spins of the first and second pinning layers 212 and 216. In a preferred embodiment the antiferromagnetic material for each of the first and second pinning layers 212 and 216 is iridium manganese (IrMn) because of its thinness.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head comprising:
   a dual spin valve sensor including:
      first and second pinned layer structures wherein each pinned layer structure has a magnetic moment;
      antiferromagnetic first and second pinning layers exchange coupled to the first and second pinned layer structures respectively for pinning the magnetic moments of the first and second pinned layers respectively;
      an antiparallel (AP) coupled free layer structure located between the first and second pinned layer structures and having a net magnetic moment; and
      a nonmagnetic conductive first spacer layer located between the first pinned layer structure and the AP coupled free layer structure and a nonmagnetic conductive second spacer layer located between the second pinned layer structure and the AP coupled free layer structure;
   the AP coupled free layer structure including:
      ferromagnetic first, second and third antiparallel (AP) coupled free layers; and
      a nonmagnetic first antiparallel (AP) coupling layer located between the first and second AP coupled free layers and a nonmagnetic second antiparallel (AP) coupling layer located between the second and third AP coupled free layers.
2. A magnetic read head as claimed in claim 1 comprising:
   ferromagnetic first and second shield layers;
   nonmagnetic nonconductive first and second read gap layers located between the first and second shield layers; and
   the dual spin valve sensor being located between the first and second read gap layers.
3. A magnetic read head as claimed in claim 2 wherein the second AP coupled free layer has a magnetic thickness that is greater than a net magnetic thickness of the first and third AP coupled free layers.
4. A magnetic read head as claimed in claim 2 wherein the magnetic thicknesses of the first and third AP coupled free layers are equal.
5. A magnetic read head as claimed in claim 2 wherein the materials of the first and second pinning layers are the same.
6. A magnetic read head as claimed in claim 2 wherein the first and third AP coupled free layers are cobalt based and the second AP coupled free layer is nickel iron based.
7. A magnetic read head as claimed in claim 6 wherein the second AP coupled free layer has a magnetic thickness that is greater than a net magnetic thickness of the first and third AP coupled free layers.
8. A magnetic read head as claimed in claim 7 wherein the magnetic thicknesses of the first and third AP coupled free layers are equal.
9. A magnetic read head as claimed in claim 8 wherein the materials of the first and second pinning layers are the same.
10. A magnetic read head as claimed in claim 9 wherein the first pinned layer structure is a double antiparallel (AP) coupled pinned layer structure that includes:
   ferromagnetic first and second antiparallel (AP) coupled pinned layers; and
   a nonmagnetic antiparallel (AP) coupling layer located between and interfacing the first and second AP coupled pinned layers.
11. A magnetic read head as claimed in claim 10 wherein the second pinned layer structure is a triple antiparallel (AP) pinned layer structure that includes:

ferromagnetic first, second and third antiparallel (AP) coupled pinned layers; and a nonmagnetic first antiparallel (AP) coupling layer located between and interfacing the first and second AP coupled pinned layers and a nonmagnetic second antiparallel (AP) coupling layer located between and interfacing the second and third AP coupled pinned layers.

12. A magnetic read head as claimed in claim 11 wherein the double AP pinned layer structure has a net magnetic moment that is equal to a net magnetic moment of the triple AP pinned layer structure.

13. A magnetic read head as claimed in claim 12 wherein:
each of the double and the triple AP pinned layer structures has a ferromagnetic coupling field with respect to the free layer structure; and
the ferromagnetic coupling fields of the double and the triple AP pinned layer structures are equal.

14. A magnetic head assembly comprising:
a write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a dual spin valve sensor;
nonmagnetic nonconductive first and second read gap layers;
the dual spin valve sensor being located between the first and second read gap layers;
a ferromagnetic first shield layer; and
the first and second read gap layers being located between the first shield layer and the first pole piece layer; and
the dual spin valve sensor including:
first and second pinned layer structures wherein each pinned layer structure has a magnetic moment;
antiferromagnetic first and second pinning layers exchange coupled to the first and second pinned layer structures respectively for pinning the magnetic moments of the first and second pinned layers respectively;
an antiparallel (AP) coupled free layer structure located between the first and second pinned layer structures and having a net magnetic moment;
a nonmagnetic conductive first spacer layer located between the first pinned layer structure and the AP coupled free layer structure and a nonmagnetic conductive second spacer layer located between the second pinned layer structure and the AP coupled free layer structure;
the AP coupled free layer structure including:
ferromagnetic first, second and third antiparallel (AP) coupled free layers;
a nonmagnetic first antiparallel (AP) coupling layer located between the first and second AP coupled free layers and a nonmagnetic second antiparallel (AP) coupling layer located between the second and third AP coupled free layers.

15. A magnetic head assembly as claimed in claim 14 including:
the read head further including:
a ferromagnetic second shield layer;
a nonmagnetic separation layer; and
the separation layer being located between the second shield layer the first pole piece layer.

16. A magnetic head assembly as claimed in claim 14 wherein the first and third AP coupled free layers are cobalt based and the second AP coupled free layer is nickel iron based.

17. A magnetic head assembly as claimed in claim 16 wherein the second AP coupled free layer has a magnetic thickness that is greater than a net magnetic thickness of the first and third AP coupled free layers.

18. A magnetic head assembly as claimed in claim 17 wherein the magnetic thicknesses of the first and third AP coupled free layers are equal.

19. A magnetic head assembly as claimed in claim 18 wherein the materials of the first and second pinning layers are the same.

20. A magnetic head assembly as claimed in claim 19 wherein the first pinned layer structure is a double antiparallel (AP) coupled pinned layer structure that includes:
ferromagnetic first and second antiparallel (AP) coupled pinned layers; and
a nonmagnetic antiparallel (AP) coupling layer located between and interfacing the first and second AP coupled pinned layers.

21. A magnetic head assembly as claimed in claim 20 wherein the second pinned layer structure is a triple antiparallel (AP) pinned layer structure that includes:
ferromagnetic first, second and third antiparallel (AP) coupled pinned layers; and
a nonmagnetic first antiparallel (AP) coupling layer located between and interfacing the first and second AP coupled pinned layers and a nonmagnetic second antiparallel (AP) coupling layer located between and interfacing the second and third AP coupled pinned layers.

22. A magnetic head assembly as claimed in claim 21 wherein the double AP pinned layer structure has a net magnetic moment that is equal to a net magnetic moment of the triple AP pinned layer structure.

23. A magnetic head assembly as claimed in claim 22 wherein:
each of the double and the triple AP pinned layer structures has a ferromagnetic coupling field with respect to the free layer structure; and
the ferromagnetic coupling fields of the double and the triple AP pinned layer structures are equal.

24. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and the read head including:
  a dual spin valve sensor;
  nonmagnetic nonconductive first and second read gap layers;
  the dual spin valve sensor being located between the first and second read gap layers;
a ferromagnetic first shield layer; and
  the first and second read gap layers being located between the first shield layer and the first pole piece layer;
the dual spin valve sensor including:
  first and second pinned layer structures wherein each pinned layer structure has a magnetic moment;
  antiferromagnetic first and second pinning layers exchange coupled to the first and second pinned layer structures respectively for pinning the magnetic moments of the first and second pinned layers respectively;
  an antiparallel (AP) coupled free layer structure located between the first and second pinned layer structures and having a net magnetic moment; and
  a nonmagnetic conductive first spacer layer located between the first pinned layer structure and the AP coupled free layer structure and a nonmagnetic conductive second spacer layer located between the second pinned layer structure and the AP coupled free layer structure;
the AP coupled free layer structure including:
  ferromagnetic first, second and third antiparallel (AP) coupled free layers; and
  a nonmagnetic first antiparallel (AP) coupling layer located between the first and second AP coupled free layers and a nonmagnetic second antiparallel (AP) coupling layer located between the second and third AP free layers;
a housing;
  a magnetic disk rotatably supported in the housing;
  a support mounted in the housing for supporting the magnetic head assembly with its ABS facing the magnetic disk so that the magnetic head assembly is in a transducing relationship with the magnetic disk;
  a spindle motor for rotating the magnetic disk;
  an actuator connected to the support for moving the magnetic head assembly to multiple positions with respect to said magnetic disk; and
  a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

25. A magnetic disk drive as claimed in claim 24 including:
  the read head further including:
    a ferromagnetic second shield layer;
    a nonmagnetic separation layer; and
    the separation layer being located between the second shield layer the first pole piece layer.

26. A magnetic disk drive as claimed in claim 24 wherein the first and third AP coupled free layers are cobalt based and the second AP coupled free layer is nickel iron based.

27. A magnetic disk drive as claimed in claim 26 wherein the second AP coupled free layer has a magnetic thickness that is greater than a net magnetic thickness of the first and third AP coupled free layers.

28. A magnetic disk drive as claimed in claim 27 wherein the magnetic thicknesses of the first and third AP coupled free layers are equal.

29. A magnetic disk drive as claimed in claim 28 wherein the materials of the first and second pinning layers are the same.

30. A magnetic disk drive as claimed in claim 29 wherein the first pinned layer structure is a double antiparallel (AP) coupled pinned layer structure that includes:
  ferromagnetic first and second antiparallel (AP) coupled pinned layers; and
  a nonmagnetic antiparallel (AP) coupling layer located between and interfacing the first and second AP coupled pinned layers.

31. A magnetic disk drive as claimed in claim 30 wherein the second pinned layer structure is a triple antiparallel (AP) pinned layer structure that includes:
  ferromagnetic first, second and third antiparallel (AP) coupled pinned layers; and
  a nonmagnetic first antiparallel (AP) coupling layer located between and interfacing the first and second AP coupled pinned layers and a nonmagnetic second antiparallel (AP) coupling layer located between and interfacing the second and third AP coupled pinned layers.

32. A magnetic disk drive as claimed in claim 31 wherein the double AP pinned layer structure has a net magnetic moment that is equal to a net magnetic moment of the triple AP pinned layer structure.

33. A magnetic disk drive as claimed in claim 32 wherein:
  each of the double and the triple AP pinned layer structures has a ferromagnetic coupling field with respect to the free layer structure; and
  the ferromagnetic coupling fields of the double and the triple AP pinned layer structures are equal.

* * * * *